(12) United States Patent
Reed et al.

(10) Patent No.: US 9,592,569 B2
(45) Date of Patent: Mar. 14, 2017

(54) METHOD AND APPARATUS FOR FORMING VISIBLE INDICIUM ON THE TAB PORTION OF A BEVERAGE CONTAINER

(75) Inventors: Jim Reed, St. Louis, MO (US); John Urbanowicz, St. Louis, MO (US); Chris Neiner, Philadelphia, PA (US); Tim DiMenna, St. Louis, MO (US); Keith Oravetz, Oklahoma City, OK (US); Gary Stowers, Oklahoma City, OK (US); Louis Lackey, Oklahoma City, OK (US)

(73) Assignee: Metal Container Corporation, Saint Louis, MO (US)

( * ) Notice: Subject to any disclaimer, the term of this patent is extended or adjusted under 35 U.S.C. 154(b) by 2108 days.

(21) Appl. No.: 12/576,130

(22) Filed: Oct. 8, 2009

(65) Prior Publication Data
US 2011/0084051 A1 Apr. 14, 2011

(51) Int. Cl.
- *B23K 26/08* (2014.01)
- *B23K 26/40* (2014.01)
- *B41M 5/24* (2006.01)

(52) U.S. Cl.
CPC ...... *B23K 26/0344* (2015.10); *B23K 26/0846* (2013.01); *B23K 26/364* (2015.10); *B23K 26/40* (2013.01); *B23K 2203/172* (2015.10); *B41M 5/24* (2013.01)

(58) Field of Classification Search
USPC .......... 219/121.82, 121.68, 121.69; 347/224, 347/260
See application file for complete search history.

(56) References Cited

U.S. PATENT DOCUMENTS

| | | |
|---|---|---|
| 4,588,262 A | 5/1986 | Nelson |
| 5,400,143 A | 3/1995 | Bauer |
| 6,080,958 A * | 6/2000 | Miller ................ B21D 51/383 219/121.68 |
| 6,105,806 A | 8/2000 | Stasiuk |

(Continued)

*Primary Examiner* — Eva Y Montalvo
*Assistant Examiner* — David Goodwin
(74) *Attorney, Agent, or Firm* — Gardere Wynne Sewell LLP

(57) ABSTRACT

A method and apparatus for forming a visible symbol or other indicium on a tab portion of a beverage container. The method comprises the steps of advancing a tab stock material through a series of tab-forming stations. The tab portion is at least partially formed from the tab stock at each of the tab-forming stations. The advancement of the tab stock is dwelled or halted while the tab is formed. The tab stock is accelerated from dwell to resume advancement of the tab stock material between the stations. A selected portion of the tab is irradiated with light energy to form the visible indicium. The apparatus comprises a plurality of tab-forming stations, each tab-forming station at least partially forming the tab from a tab stock. A conveyor or track mechanism is configured to advance the tab stock from one tab-forming station to another. An etching apparatus is associated with the conveyor and tab-forming stations to selectively etch the symbol on the tab. A sensor is coupled to the tab stock to sense acceleration of the tab stock from rest during advancement of the tab stock. The sensor is coupled to the etching apparatus to permit the etching apparatus to etch the symbol while the tab stock is accelerated.

1 Claim, 4 Drawing Sheets

(56) References Cited

U.S. PATENT DOCUMENTS

| | | |
|---|---|---|
| 6,433,302 B1 | 8/2002 | Miller et al. |
| 6,498,318 B1 | 12/2002 | Miller et al. |
| 6,501,046 B1 | 12/2002 | Miller et al. |
| 6,706,995 B2 | 3/2004 | Miller et al. |
| 6,734,392 B2 * | 5/2004 | Philipp ............... B23K 26/0838 219/121.68 |
| 6,768,504 B2 | 7/2004 | Crawley et al. |
| 6,926,487 B1 * | 8/2005 | Jendick ............................. 413/8 |
| 7,115,209 B2 | 10/2006 | Grimard |
| 7,167,194 B2 | 1/2007 | Assa et al. |
| 2004/0239836 A1 * | 12/2004 | Chase ............................. 349/98 |

* cited by examiner

METHOD AND APPARATUS FOR FORMING VISIBLE INDICIUM ON THE TAB PORTION OF A BEVERAGE CONTAINER

TECHNICAL FIELD

The invention relates to marking a symbol or other indicia upon a portion of a beverage container. More particularly, the invention relates to making such markings on beverage can opening tabs during their manufacture.

SUMMARY OF THE PRIOR ART

It has become conventional to provide increasingly colorful and complex graphics on conventional aluminum beverage cans, including the can lids and opening tabs. It is known to etch or mark letters or other symbols onto the tabs of such containers using a laser beam to "ablate," etch, or otherwise remove a coating on the tab stock material to expose bare metal underneath in a shape or pattern corresponding to the letter, symbol, or other indicium. Conventionally, this laser etching is done as a stage of the tab manufacturing process, in which aspects of the tab are cut, stamped, and otherwise formed. The tab stock is maintained stationary while the forming operations occur and then is moved between stations or manufacturing operations. The stationary period is referred to as "dwell" and the conventional laser etching process occurs during this dwell period.

U.S. Pat. No. 6,433,302 discloses the use of a laser for marking metal containers or container components in a relatively short period of time, preferably less than a normal component production dwell time.

U.S. Pat. No. 6,105,806 discloses a pull tab container opening device having an epoxy coating layer and a laser etched image defined on said tab wherein the image is created by localized laser removal of the coating layer to expose an uncoated surface of the pull tab.

U.S. Pat. No. 6,080,958 discloses an apparatus for forming markings on a portion of an aluminum container comprising a drive which moves the portions of an aluminum container away from a marking station at least after a laser light has marked the portion of the aluminum container.

U.S. Pat. No. 6,498,318 discloses a method for making metallic containers having selectable patterns thereon controlling laser light so as to ablate a desired region of at least a component of the container end during a dwell phase of a tab forming operation wherein a selectable pattern is placed on the desired region and in which the component of the container end is a container opening tab.

U.S. Pat. No. 6,501,046 discloses a process for providing a tab stock marked by a light path deflection system to position laser light from a laser in order to place indicium on an under surface of at least the first tab within a window of time defined by the dwell time.

U.S. Pat. No. 6,706,995 discloses a method for marking a portion of a tab stock using a laser while the tab stock resides in one place.

SUMMARY OF THE INVENTION

It is a general object and aspect of the present invention to provide a method and apparatus for forming a visible symbol or other indicium on a tab portion of a beverage container. The method comprises the steps of advancing a tab stock material through a series of tab forming stations. The tab portion is at least partially formed from the tab stock at each of the tab forming stations. The advancement of the tab stock is dwelled or halted while the tab is formed. The tab stock is accelerated from dwell to resume advancement of the tab stock material between the stations. A selected portion of the tab is irradiated with light energy to form the visible indicium. The irradiation occurs during acceleration of the tab stock.

According to one embodiment of the present invention, the tab stock is coated with a plurality of layers of polymer material, including an outer layer and an inner layer. The selected portion of the tab is irradiated sufficiently to ablate or remove at least the outer of the plurality of layers of polymer material and expose the inner layer of polymer material.

According to one embodiment of the present invention, the irradiation step further comprises sensing the acceleration of the tab stock to provide a sensed acceleration and controlling the radiating step using the sensed acceleration of the tab stock.

According to one embodiment of the present invention, the sensing step further comprises detecting movement of a portion of one of the tab forming stations corresponding with acceleration of the tab stop.

According to another aspect of the present invention, an apparatus for etching a visible symbol on a tab of a container comprises a plurality of tab-forming stations, each tab forming station at least partially forming the tab from a tab stock. A conveyor or track mechanism is configured to advance the tab stock from one tab-forming station to another. An etching apparatus is associated with the conveyor and tab-forming stations to selectively etch the symbol on the tab. A sensor is coupled to the tab stock to sense acceleration of the tab stock from rest during advancement of the tab stock. The sensor is coupled to the etching apparatus to permit the etching apparatus to etch the symbol while the tab stock is being accelerated.

According to another aspect of the present invention, the etching apparatus further comprises a computer-controlled laser system configured to direct a laser beam at a portion of the tab stock to etch the symbol on the tab.

According to another aspect of the present invention, the sensor further comprises a position encoder coupled to a portion of one of the conveyor and tab-forming stations, wherein acceleration associated with advancing the tab stock between tab-forming stations is detected by the encoder and is communicated to the computer-controlled laser system.

Other objects, features, advantages and aspects of the present invention will become apparent with reference to the figures and the detailed description, which follow.

DETAILED DESCRIPTION OF THE INVENTION

Figure 1:
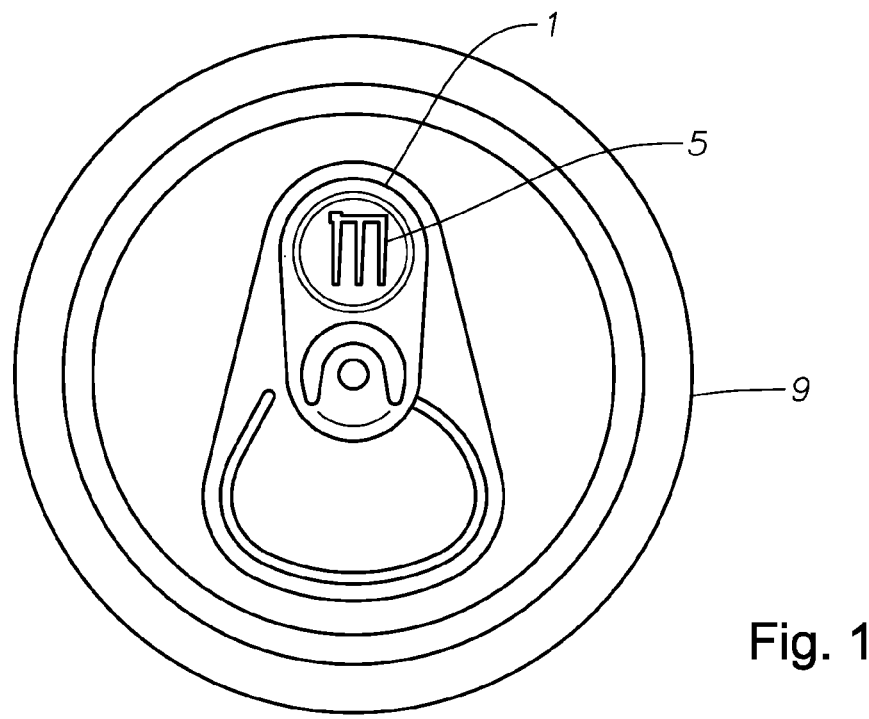
FIG. 1 is a top view of a container incorporating the tab portion of a beverage container according to the present invention.
Figure 2:
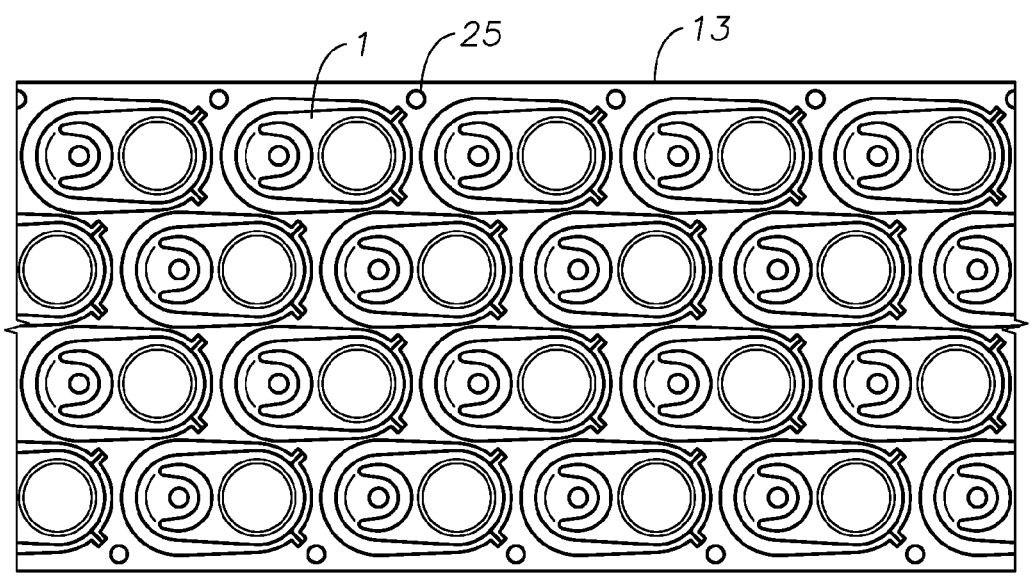
FIG. 2 is a plan view of the tab stock from which the tab of FIG. 1 is made.

Referring now to the Figures, and particularly to FIGS. 1 and 2, the numeral 1 generally designates an exemplary opening tab of an exemplary beverage container according to the present invention. As shown in the Figures, the tab portion 1 is marked with a symbol 5 or other form of indicia or indicium, in this case a stylized letter M, and is attached to a beverage container 9. Such tabs 1 are conventional and conventionally attached to cans or containers. Further, it is known to mark symbols or other indicia on such tabs.

FIG. 2 is a plan view of the tab stock 13 that illustrates tabs cut and partially formed from the initially flat and featureless tab stock 13. The illustrated tab stock 13 is "four tabs wide," which means that four tabs are being formed at any given moment in the process. A "four-wide" tab-forming "line" may produce marked tabs at a rate exceeding 100 units per minute more than tab-forming "lines" that employ two tab-wide, or "two-wide" tab stock. The tab stock thus is advanced through the line at a higher rate than previous (two tab-wide) tab stock. Thus, the dwell time of the line is insufficient to mark the tabs fully while stationary. As described below, the present invention permits the tabs to be marked while the tab stock is moving or accelerating from dwell. As discussed in greater detail in connection with FIGS. 3, 4 and 5, tab stock 13 is advanced between a plurality of tab-forming stations, each of which successively, progressively, or serially forms a portion of the tab 5 from the flat tab stock. One of the tab-forming stations includes a laser station, where the mark or indicium (FIG. 1) is formed by laser etching or ablation of one or more layers of coating present on the tab stock 13.

Figure 3:
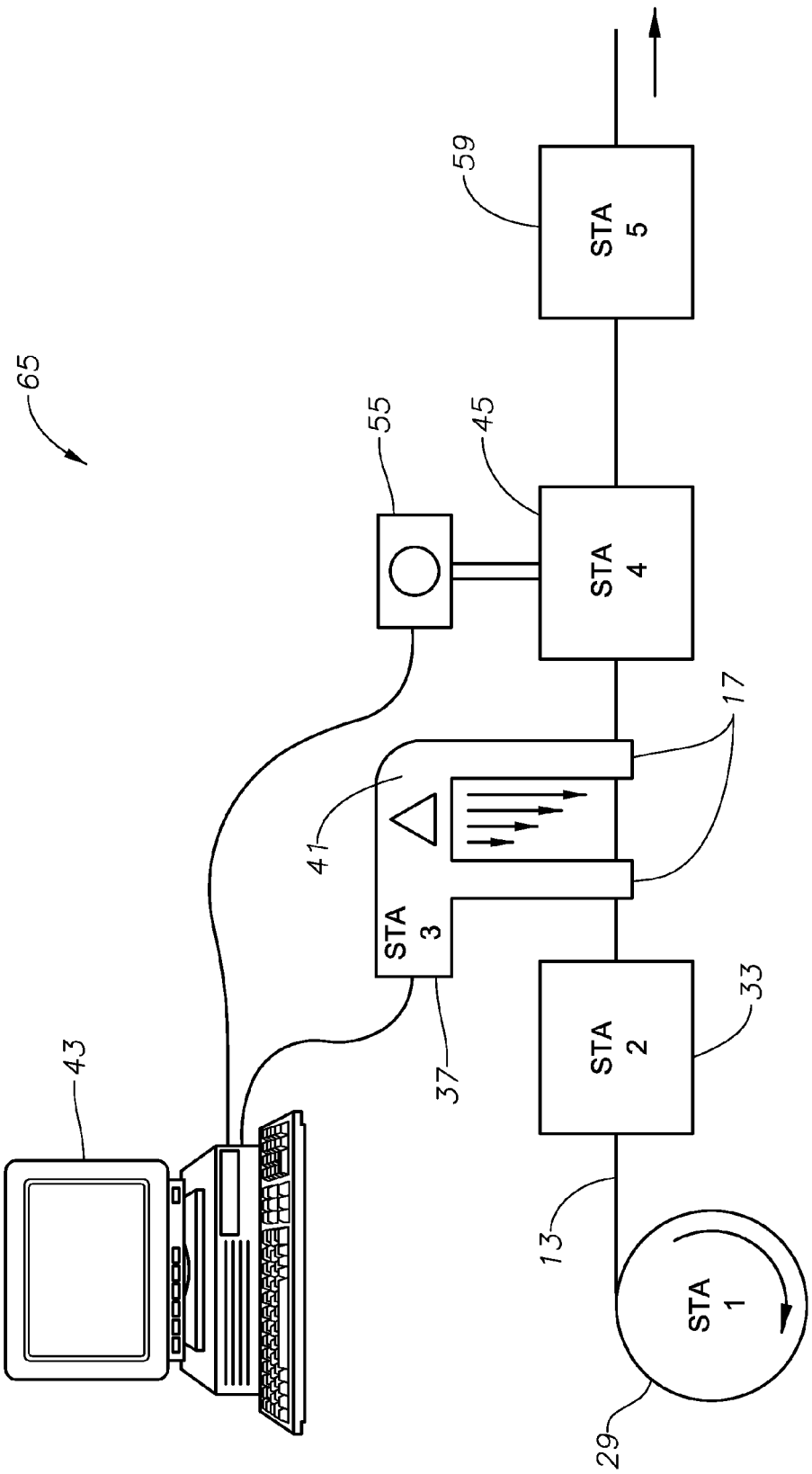
FIG. 3 is a schematic diagram depicting components of the tab-forming and marking line according to an exemplary embodiment of the present invention.

FIG. 3 schematically illustrates an exemplary tab-forming "line" according to the present invention. Flat, continuous tab stock (shown in FIG. 3) is supplied and kept on a coil that is uncoiled or unwound and fed onto a track or conveyor at a first station 29. Tab stock then is pulled onto the conveyor or track by a tugger, station 33. The first tab-forming station is a laser station 37, which provides a laser and associated computer control apparatus that irradiates the tab stock with laser energy, to thereby etch or ablate a coating on the tab stock to form the symbol or indicium. According to the exemplary embodiment of the present invention, laser 41 and its controller are a SunX Model LP-432A, available from SunX Limited, 2431-1 Ushiyama-cho, Kasugai-shi, Aichi, 486-0901, Japan. According to the exemplary embodiment, the laser 41 irradiates the surface of the tab stock 13 at 342.61 pulses per millimeter at 100% of its rated power, 20 watts. The power of the laser preferably is selected so that the laser cannot ablate or damage the underlying aluminum tab stock material and is operated at 100% power to remove material as quickly as possible without damaging the aluminum. One such laser is provided for each tab section on the tab stock 13, in this case four. Next, a pacer or tab feeder 45 pushes the tab stock along the track or conveyor from the laser station 37 to the tab die or forming station 59, which contains a plurality (12) of dies and presses that serially cut and form each tab as the tab stock is advanced through the tab die station. During the action of each die and associated press, the tab stock is "dwelled" or maintained stationary. When the forming operation is complete, pacer 45 accelerates the tab stock from stationary or dwell and advances it to the next tab-forming die or station. It is known to mark tabs using a laser apparatus while the tab stock is stationary or in dwell between operations. Thus, each of the tab-forming stations, considered individually, is conventional. However, as described in greater detail in connection with FIGS. 6 and 7, their arrangement and operation together to mark a symbol using the laser while the tab stock is moving is one aspect of the present invention.

Figure 4:
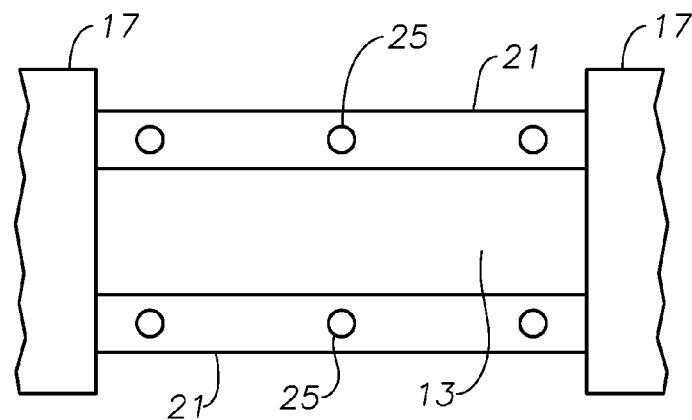
FIG. 4 is a top view of the flat channel guide for the tab stock.

FIG. 4 depicts a flat channel guide 17 that serves as a track or conveyor for the continuous ribbon of the tab stock that carries the tab stock between the various tab-forming stations as described above. Guide 17 has two longitudinal portions 21, held together by screws 25, that enclose and capture the longitudinal edges of tab stock 13 and serve to relatively rigidly position the tab stock 13 so that marking and other tab-forming operations occur on relatively precise locations on the stock.

Figure 6:
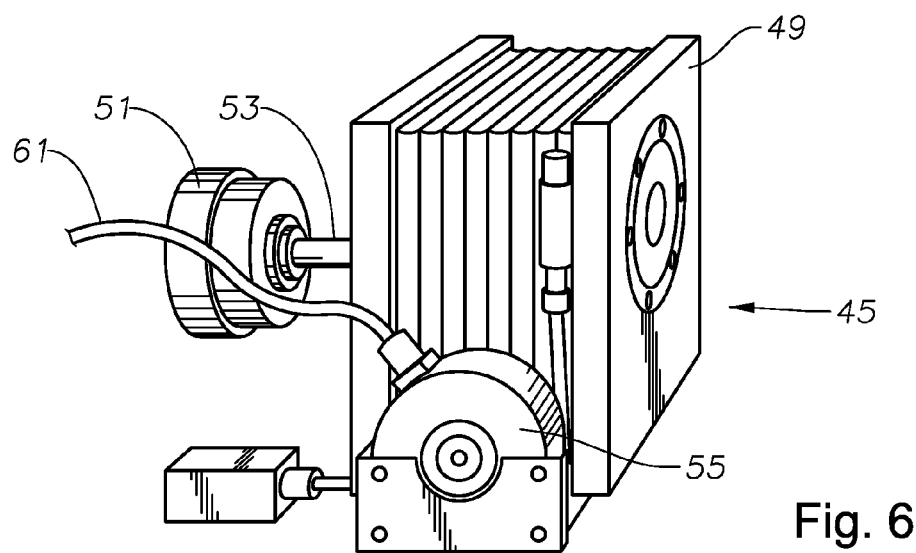
FIG. 6 is a perspective view of the encoder linked to the gearbox assembly of the tab stock feeder according to the present invention.
Figure 7:
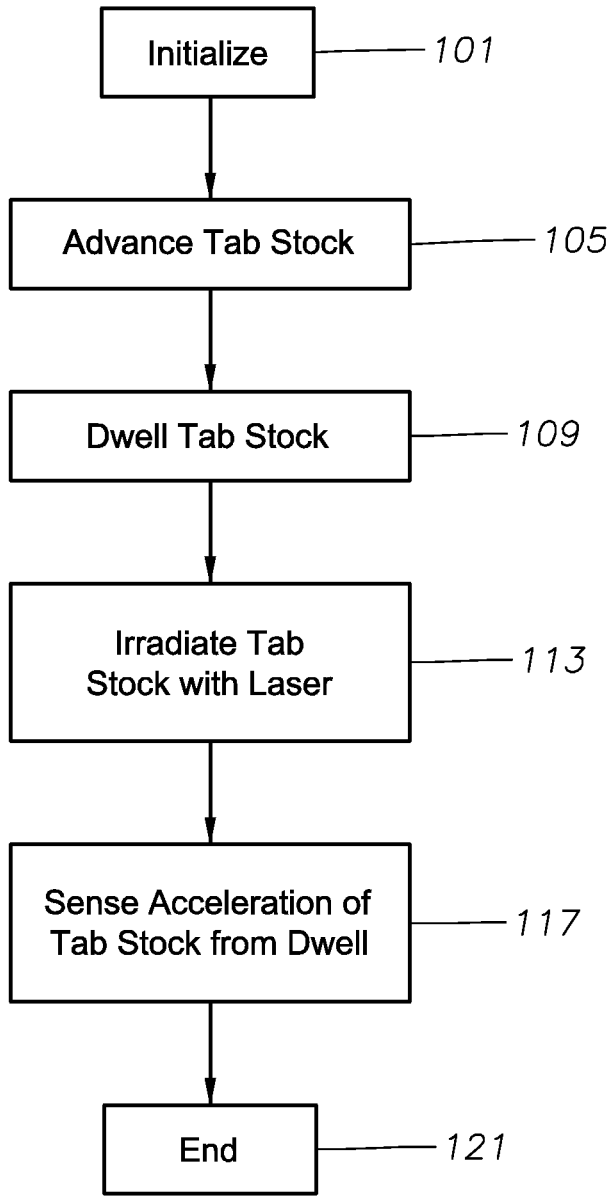
FIG. 7 is a flow chart depicting methods of marking according to the exemplary embodiment of the present invention.

As depicted in FIGS. 3, 6 and 7, the tab stock 13 is advanced from a first station (uncoiler 29), which unwinds the tab stock. The uncoiled tab stock 13 advances from the first station uncoiler 29 to a second station (tugger 33) which feeds the tab stock 13 from the uncoiler 29 into a third station (laser stand 37) which is a housing containing a section of the flat channel guide 17 and the actuator and emitter 41, which ablates, etches, or removes a coating from the tab stock 13 according to the present invention. The laser actuator and emitter 41 are connected to a computer control terminal 43 which controls the laser actuator and emitter 41. From the laser stand 37, the tab stock advances to the fourth station (tab feeder 45), which comprises a gearbox assembly 49, driven by an electric motor (not shown) and belt drive 51. The power input shaft 53 of tab feeder 45 gearbox assembly 49 is connected to a digital encoder 55. Encoder preferably is a Sick Stegmann Model DGS35-8HN100. Digital signals generated by the digital encoder 55 are transmitted to the computer control terminal 43 by a digital encoder input cable 61. Laser etching or marking is commenced when the tab stock 13 is dwelled or stationary. Upon movement of the shaft 53 corresponding to acceleration of the tab stock from the stationary or dwell position, the digital encoder 55 signals the computer control terminal 43 and provides acceleration and position data to the computer control terminal 43 such that the tab stock 13 can be marked while the tab stock 13 is moving or accelerating, as well as during the stationary dwell period. According to the preferred embodiment of the present invention, marking is initiated during dwell of the tab stock and completed during acceleration and is the first tab-forming operation performed. That is, marking is performed on flat, featureless tab stock before any aspect of the tab is formed.

Figure 5:
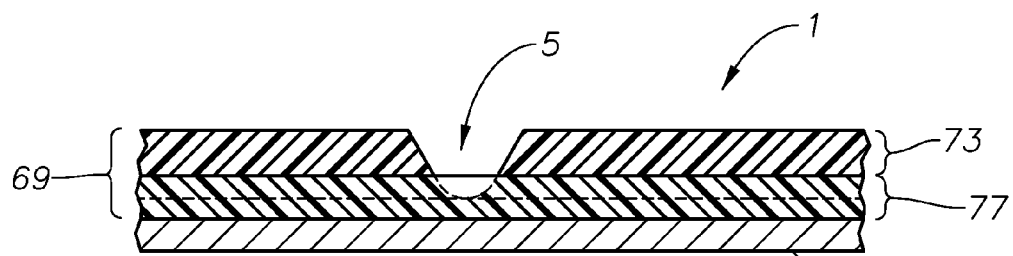
FIG. 5 is a cross-sectional view of a portion of a tab showing layers formed on the tab.

FIG. 5 shows a section view of the tab stock 13, which preferably is coated with two or more layers of coating 69, which may be anodizing of the aluminum substrate, or polymeric coatings, such as epoxy. According to the preferred embodiment of the present invention, the outer coating 73 is colored and the inner coating 77 is transparent or translucent. Upon etching, ablation, or removal of a portion 5 of the outer coating 73, the inner coating 77 is left to show through and to protect the metal material of the tab. Selectively removing portions of the outer coating 73 in a selected pattern forms the symbol or indicia according to the present invention. Multiple layers of coating, in different color combinations, permit formation of quite colorful symbols or indicia by selective removal of only a portion of each layer.

FIG. 6 shows the tab feeder 45 comprising the gearbox assembly 49 having a power input shaft 53 driven by a belt 51, which is itself powered by crankshaft of the tab die or press for synchronization purposes. The digital encoder 55 is mounted on shaft 53 according to the exemplary embodiment of the present invention. Upon of rotational movement of shaft 53 of tab feeder 45, the digital encoder 51 produces a digital signal, indicative of movement, acceleration and position of the shaft, which corresponds to movement, acceleration, and position of the tab stock 13, which is transmitted electronically to the laser controller 43 via the digital encoder cable 61. The digital encoder signals the position and acceleration of the tab stock from the dwell phase of the tab-forming cycle to the laser controller 41, allowing laser 41 to precisely mark or remove coating from the tab stock 13 while it is moving or accelerating from the dwell position. Similarly, when shaft 53 comes to rest, indicative of dwell of the tab stock 13, laser ablation is begun or actuated.

FIG. 7 is a flowchart representation of the tab-forming and marking method according to the exemplary embodiment of the present invention. At the first step 101, all mechanical aspects of the line are initialized or readied, including the loading of a coil of tab stock on the uncoiler and initialization of the laser 41 and its control apparatus. Any system checks are performed at this step. Next, at step 105, the uncoiled tab stock is then advanced from one tab-forming station to another, including the laser station. During forming operations, the tab stock is dwelled or maintained stationary, at step 109. Irradiation of tab stock 13 with laser then is commenced to begin formation of the symbol or indicium 5. After the individual tab-forming operation is completed during the dwell stage, movement or acceleration of the tab stock is sensed by the encoder and the acceleration and position information is fed to the laser 41 and control apparatus 43, at step 113. This permits the laser marking operation to continue during acceleration or movement of the tab stock 13, at step 117. Thus, marking is accomplished during both dwell and moving or accelerating phases of tab stock movement. The process is repeated continuously until the tab stock 13 is marked and completely formed into tabs, at which point the method ends, at step 121.

A laser ablation method for marking tab stock is generally known. However, a marking system that provides a method and apparatus for marking tab stock during a stationary or "dwell" phase and a moving or "acceleration" phase without rate limiting the tab-forming "line" is unique to the exemplary embodiment of the present invention. A preferred embodiment of the present invention provides a means and apparatus for marking tab stock in a configuration four tabs-wide, as depicted in FIG. 2. The laser apparatus of the preferred embodiment consists of four laser marking apparatus which mark each of four tabs during a shortened tab stock advancement cycle by extending the marking time beyond the dwell phase of the advancement cycle so that tab stock is marked while moving or accelerating. The preferred embodiment improves upon earlier applications by providing a means and apparatus for marking tabs moving from a stationary position to an accelerating position. The present invention thereby avoids adversely affecting the improved production rate of the "four-wide" tab-forming "line" for marked beverage container tabs.

It is to be expressly understood that the claimed invention is not limited to the description of a preferred or exemplary embodiment and may encompass other modifications and improvements within the scope and spirit of the inventive concept.

We claim:

1. An apparatus for etching a visible symbol on a tab of a container, the apparatus comprising:
    a plurality of tab-forming stations, each tab-forming station at least partially forming the tab from a tab stock;
    a conveyor mechanism configured to advance the tab stock from one tab-forming station to another;
    a computer-controlled laser system associated with the conveyor and the tab-forming stations to selectively etch a symbol on the tab; and
    a sensor coupled to the tab stock to sense acceleration of the tab stock from rest during advancement of the tab stock, the sensor coupled to the computer-controlled laser system to permit the computer-controlled laser system to etch the symbol while the tab stock is accelerated from rest, the sensor comprising a position encoder coupled to the conveyor or one of the plurality of tab-forming stations, wherein acceleration associated with advancing the tab stock between tab-forming stations is detected by the position encoder and its magnitude is communicated to the computer-controlled laser system.

* * * * *